United States Patent
Stepanenko et al.

(10) Patent No.: US 8,667,340 B2
(45) Date of Patent: Mar. 4, 2014

(54) METHOD AND SYSTEM FOR DISTRIBUTED PROCESSING OF ALERTS

(75) Inventors: Anna Stepanenko, Sunnyvale, CA (US); Bhuvaneswari Chellappan, San Jose, CA (US); Sylvain B Puccianti, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 13/074,795

(22) Filed: Mar. 29, 2011

(65) Prior Publication Data

US 2012/0254675 A1 Oct. 4, 2012

(51) Int. Cl.
    *G06F 11/00* (2006.01)
(52) U.S. Cl.
    USPC .................................................. 714/57
(58) Field of Classification Search
    USPC .................................................. 714/57
    See application file for complete search history.

(56) References Cited

U.S. PATENT DOCUMENTS

| 6,185,613 | B1 | 2/2001 | Lawson et al. |
| 7,111,305 | B2 | 9/2006 | Solter et al. |
| 7,568,124 | B2 * | 7/2009 | Ali et al. ............ 714/6.3 |
| 2002/0099786 | A1 | 7/2002 | Chun |
| 2005/0081119 | A1 * | 4/2005 | DiZoglio et al. ........ 714/47 |
| 2007/0130319 | A1 | 6/2007 | Tse et al. |
| 2013/0138998 | A1 * | 5/2013 | Ichikawa et al. ........ 714/4.11 |

OTHER PUBLICATIONS

Siraj, A., et al.; "A Cognitive Model for Alert Correlation in a Distributed Environment"; 2005; pp. 218-230.

* cited by examiner

*Primary Examiner* — Yair Leibovich

(57) ABSTRACT

A distributed computing system includes a plurality of inter-communicating component machines. In a method for alert processing, when a component machine fails to perform an operation, and no alert information regarding that operation is currently stored by that component machine, peer machines among the component machines are identified with regard to the operation. Notification is sent to the peer machines regarding failure to perform the operation, notifying the peer machines to store alert information regarding the operation. The component machine stores the alert information regarding the operation and issues an alert corresponding to the failure to perform the operation. A computer readable medium containing executable instructions is also described.

18 Claims, 5 Drawing Sheets

METHOD AND SYSTEM FOR DISTRIBUTED PROCESSING OF ALERTS

BACKGROUND

A distributed computing system includes several intercommunicating machines. The various component machines of the distributed computing system may be configured or assigned to perform various tasks. Although each component machine may operate autonomously, the tasks of the various component machines may include overlapping function, or may require interaction with common devices or components.

A computing system may be configured with an alert framework. An alert framework evaluates the health of the system and communicates the results of the evaluation to an output device. For example, when the alert framework detects a problem with the system, it issues an alert. When the alert framework detects that the problem is resolved, it clears the alert.

DETAILED DESCRIPTION

Figure 1:
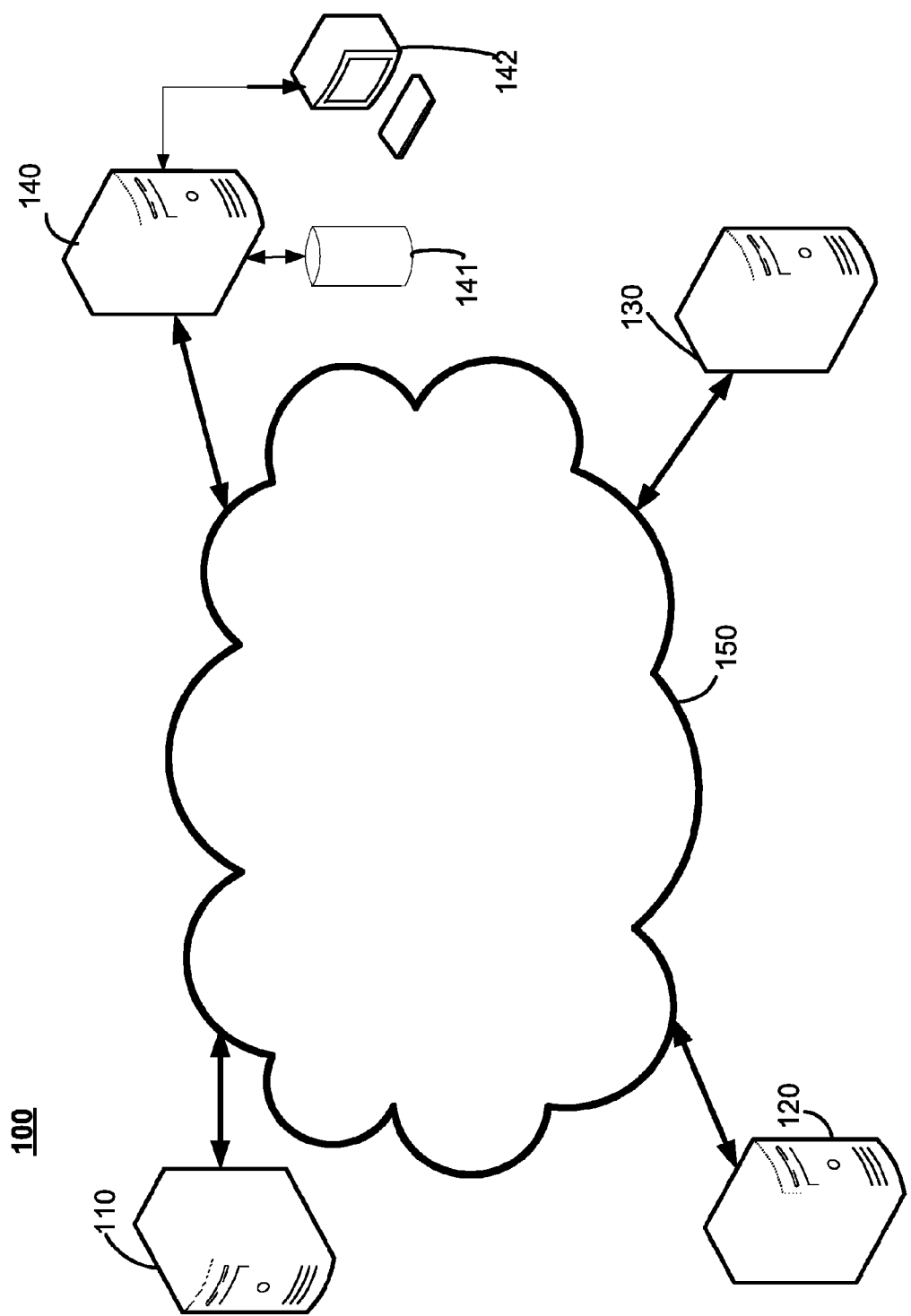
FIG. 1 illustrates a schematic of a distributed computing system in accordance with an embodiment of the invention.

In accordance with an embodiment of the invention, a peer coordination mechanism is applied to process alerts in a distributed computing system. The distributed computing system includes a plurality of intercommunicating component machines. A predefined list of alerts includes the types of alerts that could be issued by component machines of a particular distributed computing system. Each type of alert in the list corresponds to an operation that can be performed in the system. When the operation is not performed successfully, the corresponding alert is issued. When the operation can be performed successfully, a corresponding previously issued alert is cleared. In accordance with an embodiment of the invention, when the component machines are initialized, each machine retrieves the list of alerts and their corresponding operations from a central repository of the system. The component machine uses this list to find the alert information corresponding to an operation.

In accordance with an embodiment of the invention, when a component machine within a distributed computing system attempts to perform an operation and fails (e.g. due to a failure of connectivity or failure to access a database), it retrieves alert information that corresponds to the operation from a previously retrieved list of alert types. The component machine checks its local repository to see if an alert for the failed operation has already been issued. If not, the component machine communicates the alert information to other component machines of the distributed computing system that are capable of encountering the same problem (e.g. machines which perform the same operation), referred to as peer machines. The component machine and each of the peer machines stores the communicated alert information in an appropriate local repository associated with that machine.

Thus, when a component machine of the distributed computing system performs an operation and encounters failure, indicating a problem that warrants issuing a particular alert, the local repository of stored alert information is checked. If the local repository includes information corresponding to that particular alert, no alert is issued. Otherwise, the component machine issues an alert, also communicating the alert information to the peer machines. Thus, the peer machines, following the same procedure, do not issue duplicate alerts when encountering the same problem.

Failure of an operation for which an alert was issued, may be associated with a particular device, or component of a device, with which component machines of the distributed computing system interact, or with a particular functionality which component machines utilize. A peer machine of the component machine that encountered the failure may perform the same operation and hence may interact with the same device, or component of a device. After an alert was issued by a component machine, a problem that caused the failure associated with the device or component of a device may be resolved. Later, a peer machine of that component machine may successfully perform the same operation. Since it detects no problem with the device or component of a device, it attempts to clear the alert. The peer machine retrieves the alert corresponding to the operation it performed, from the list of alert types it retrieved as part of initialization. The peer machine uses the alert information and checks its local repository to identify if an alert is issued for it. If so, the peer machine clears the alert and removes it from its local repository, also communicating clearing of the alert to its peer machines. The peer machines then delete the corresponding alert information from their local repositories.

Thus, the peer coordination mechanism enables each component machine to operate in accordance with its peers' actions, enabling separate component machines to take action on a single alert. The combination of peer coordination and distributed processing may enable a user or system administrator who is monitoring an appropriate output device to receive real-time information about the system's health.

In accordance with an embodiment of the invention, distributed alerts are processed differently than non-distributed alerts. A distributed alert refers to an alert that may be issued by more than one component machine of the distributed computing system. The system maintains a predefined list of the types of alerts which the system is configured to issue, as well as predefined information associated with each type of alert (whether distributed or not). When a component machine performs an operation and the operation fails, prior to issuing an alert, it performs peer discovery and peer-to-peer communication. Peer discovery includes retrieving a list of its relevant peers (component machines capable of issuing that type of alert). The list of relevant peers may be retrieved from a central repository that contains information regarding all component machines of the distributed computing system. Alternatively, each component machine may separately maintain a list of component machines from which peer machines may be identified. The separately maintained lists may be updated or coordinated at predetermined times.

Using peer-to-peer communication, the component machine informs its peers that it is issuing a predefined alert from the list of alerts. The component machine issues the alert to an administration console attached to the distributed system. This console displays the alert in an appropriate output device. Thus, all relevant peers are informed of the detected problem with the system and a user monitoring the display device is presented with a list of current problems in the system.

Subsequently, if a peer machine detects the same problem, it will not issue the alert again. In this manner, the user and/or system administrator is not presented with duplicate alerts.

If, subsequent to the alert being received, a peer machine is able to successfully perform an operation concerning which an alert had been issued, it clears the alert: Upon successfully performing the operation, the peer machine checks its local repository to see if an alert was issued for this operation. If so, the peer machine clears the alert. In accordance with an embodiment of the invention, a protocol for clearing an alert is similar to the protocol for issuing an alert: The peer machine retrieves a list of its relevant peers from a central repository of information. Using peer-to-peer communication, the machine informs its peers that it is clearing that particular alert. The machine clears the alert by sending a notification to the administration console, which removes the alert from the list presented in the appropriate output device.

In accordance with this peer coordination mechanism, when resolution of a problem is detected by a component machine of the distributed computing system, its peer machines are notified as well as a user and/or system administrator monitoring the administration console of the system. Each component machine is capable of clearing an alert that was raised by one of its peers, so that clearing an alert is handled in a distributed manner. Thus, information regarding a change in the state of the distributed computing system may be provided to the user sooner than would have been possible if only the machine that issued an alert were capable of clearing it.

FIG. 1 illustrates a schematic of a distributed computing system with peer coordination, in accordance with an embodiment of the invention. Distributed system 100 includes a plurality of component machines, such as component machines 110, 120, and 130. Component machines 110, 120, and 130 represent autonomous computing entities. For example, component machines 110, 120, and 130 may represent separate computers, separate processors of a computer, or separate autonomous modules or processes of a computer. Each component machine 110, 120, and 130 typically includes a processor and a data storage component that enables storing of data and retrieval of stored data. The data storage component may refer to a runtime memory device (e.g. random access memory), or to a permanent storage device. For example, alert-related information may be stored in a runtime memory only, such that the alert-related information is refreshed if a component machine 110, 120, or 130 is restarted.

Administration console 140 is connected to user interface 142. Administration console 140 may represent a single device (e.g. computer or processor) or work station associated with distributed computing system 100. Alternatively, administration console 140 may collectively represent several devices, each configured to provide some or all of the functionality of administration console 140. User interface 142 typically includes one or more output devices (such as a display screen, display panel, or speaker). User interface 142 typically also includes one or more input devices (such as a keyboard, keypad, mouse or similar pointing and selecting device, a touch screen or touch pad, or an audio or optical input device). An alert issued by a component (e.g. by component machine 110, 120, or 130) may cause appropriate output by an output device of user interface 142. For example, a display device of user interface 142 may display a list of current alerts that represents the current status of the system.

Administration console 140 includes data storage device 141. Data storage device 141 may represent one or more data storage devices on which system data may be stored, and from which system data may be retrieved. For example, such system data may include a list of component machines of distributed computing system 100, a list of the types of possible alerts that may be issued along with a mapping of each alert type to an associated operation whose failure triggers issuing that, and a listing of which machines are configured to issue which alerts.

Component machines 110, 120, and 130 are configured to communicate with one another and with administration console 140 via communications medium 150. Communications medium 150 may represent any medium that enables component machines 110, 120, and 130 and administration console 140 to send messages or data to one another. For example, communications medium 150 may represent a communications channel between autonomous modules or processes running within a single computer, a hardwired link between individual processors or computers, or a wired or wireless network link between separate computers. Communications medium 150 may enable mutual intercommunication among all of component machines 110, 120, and 130 and administration console 140, or may enable selected communications among various subsets of the above.

Together component machines 110, 120, 130 and administration console 140 form a distributed computing system 100. In distributed computing system 100, peer-to-peer communication among component machines 110, 120, 130 and administration console 140 is enabled via communications medium 150.

Figure 2A:
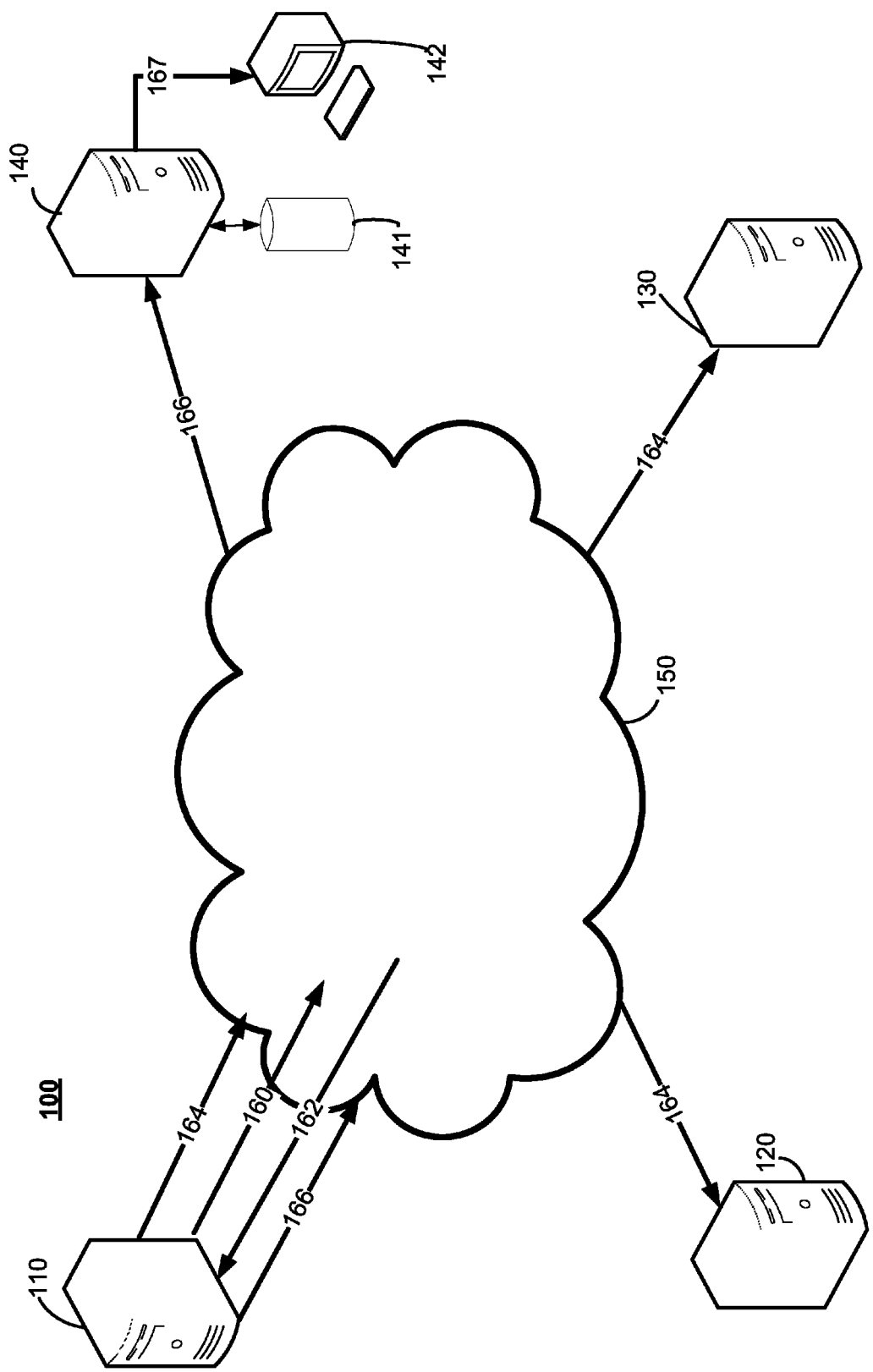
FIG. 2A schematically illustrates a protocol for issuing an alert by a component machine of the distributed computing system shown in FIG. 1, in accordance with an embodiment of the invention.

FIG. 2A schematically illustrates a protocol for issuing an alert by a component machine of the distributed computing system shown in FIG. 1, in accordance with an embodiment of the invention. For example, component machine 110 may perform operation 160 in distributed computing system 100. Operation 160 may involve using a resource connected to distributed computing system 100. For example, operation 160 may include retrieving data from a database. A problem may be detected by component machine 110 while performing operation 160 (e.g. database is down). Component machine 110 receives a negative result 162 upon performing operation 160. Upon receiving negative result 162, component machine 110 follows a protocol for issuing an alert. Component machine 110 retrieves the alert information (e.g. A001) corresponding to operation 160 from a list of alert types that it retrieved during initialization. Then, component machine 110 retrieves a list of its peers from a central repository of information (e.g. from data storage device 141 of administration console 140). The list of peers includes a listing of any other component machines (e.g. component machines 120 and 130) of distributed computing system 100 that are configured to perform operation 160. After its peers are identified, component machine 110 sends notification message 164 to peer component machines 120 and 130 via communications medium 150. Notification message 164 includes identification of the alert corresponding to operation 160 (e.g. A001) and information that the alert should be issued. Each of peer component machines 120 and 130 stores the alert information (e.g. A001) in its associated data storage device (e.g. in runtime memory). Component machine 110 also sends alert message 166 to administration console 140 via communications medium 150. Alert message 166 includes identification of the alert (e.g. A001) and information that the alert should be displayed. Administration console 140 sends alert display command 167 to user interface 142. An output device of user interface 142 then displays the relevant alert (e.g. A001). For example, the alert (e.g. A001) may be added to a displayed list of alerts that are currently in effect. In addition, a displayed message or audible tone may be generated to indicate addition of a new alert to the list. Any such method of generating an indication is herein referred to as displaying.

In accordance with an embodiment of the invention, component machine 120 or 130 may also perform same operation as operation 160, and receive a negative result (e.g. negative result 162) when the operation fails. The component machine that fails to perform operation 160 retrieves the alert (e.g. A001) corresponding to operation 160 (or the negative result) from the list of alert types it retrieved during its initialization. The component machine searches its data storage device for list of currently issued alerts in the system. If the associated alert information (e.g. A001) is found, the component machine that also failed to perform operation 160 does not generate the associated alert message (e.g. alert message 166), and the indicated alert (e.g. A001) is not displayed a second time.

As a specific example, two or more component machines (e.g. component machines 110, 120, and 130) perform the operation of copying data from a point A to a point B. Each of the component machines may perform this operation at different points in time. For performing the copy operation, network connectivity between points A and B is a prerequisite. At a time when there is a problem with the network connection between point A and point B, the copy operation may be performed by component machine 110. Machine 110 will get a negative result for the copy operation. Component machine 110 will follow the protocol to issue alert and at the end of the process, peer machines 120 and 130 will have been notified that an alert for the copy operation has been issued. Alternatively, in this example, copying data from point A to point B may be divided into component operations, e.g. reading data from point A, transferring from point A to point B, and writing data to point B. A separate alert may be associated with each of these component operations.

Figure 2B:
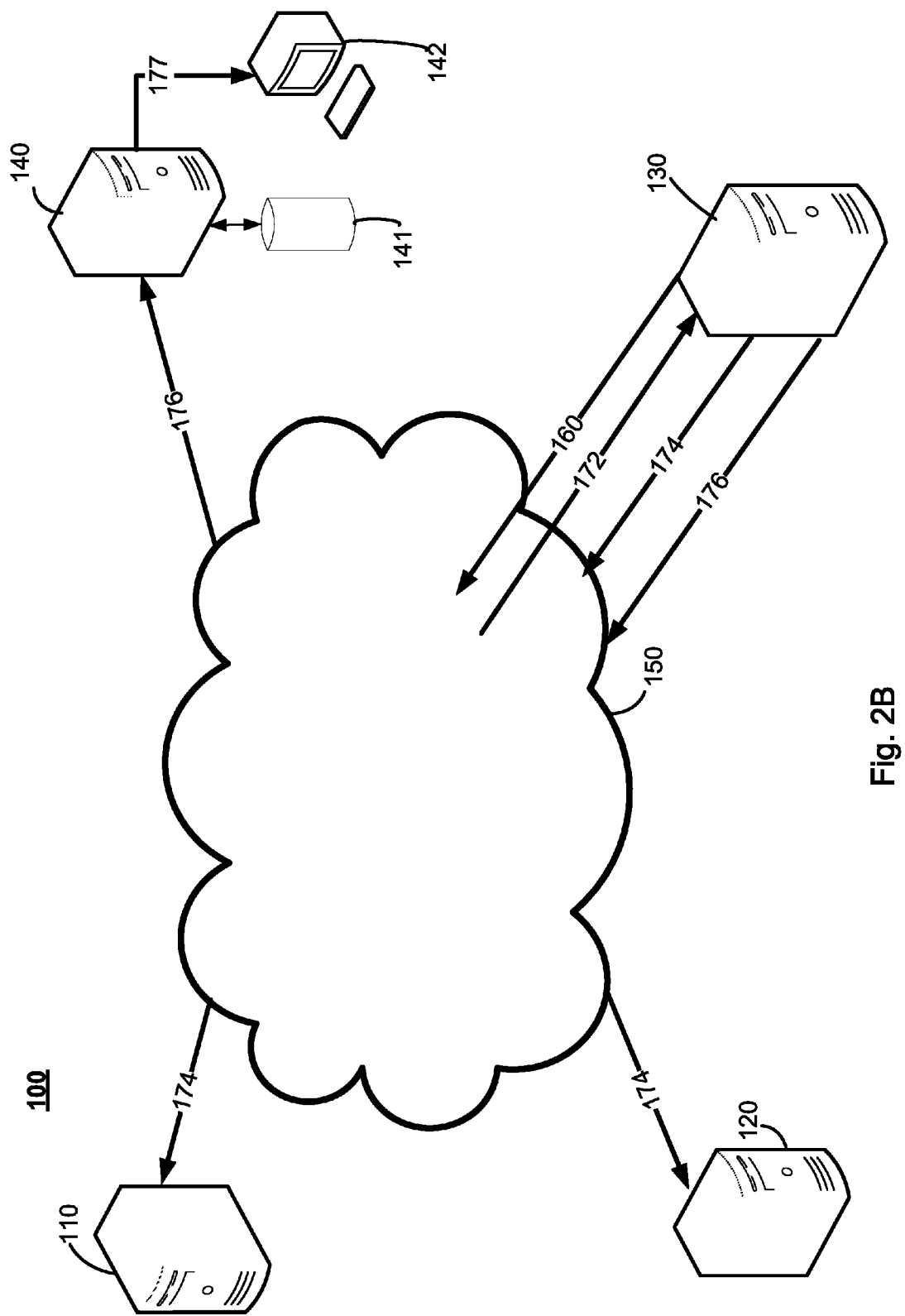
FIG. 2B schematically illustrates a protocol for clearing an alert by a component machine of the distributed computing system shown in FIG. 1, in accordance with an embodiment of the invention.

FIG. 2B schematically illustrates a protocol for clearing an alert in the distributed computing system shown in FIG. 1, in accordance with an embodiment of the invention. Component machine 130 has previously received a notification message (e.g. notification message 164 in FIG. 2A) regarding failure of an operation (e.g. operation 160) by a peer component machine, e.g. component machine 110. As a result of the detected problem, an alert was issued (e.g. alert A001). Component machine 130 has stored the alert information in its associated data storage device.

Component machine 130 performs operation 160 successfully. It detects that there is no problem corresponding to operation 160, by obtaining successful result 172. Component machine 130 retrieves the alert information corresponding to operation 160 from the list of alert types it retrieved as part of initialization (e.g. A001). Component machine 130 searches its local repository to check if a corresponding alert (e.g. A001) had been previously issued. Machine 130 may find the alert information (e.g. A001) in its local repository and hence follow the protocol to clear the alert. Machine 130 may then identify its peer machines by accessing the central repository of distributed computing system 100. After identifying its peers as component machines 110 and 120, machine 130 sends clear notification message 174 to component machines 110 and 120 via communications medium 150.

Notification message 174 includes identification of the alert corresponding to successful operation 160 (e.g. A001) and information that previously issued alert should be cleared (e.g. removed from each data storage device associated with component machines 110 and 120). The peer component machines then each clear the previously stored alert information. Component machine 130 also sends a clear alert message 176 via communications medium 150. Clear alert message 176 includes identification of the alert (e.g. A001) along with information that this alert should be removed from the display. Administration console 140 then sends an alert removal command 177 to user interface 142. The previously displayed alert (e.g. A001) is then removed from the output device of user interface 142. For example, the previously issued alert may be removed from a displayed list of alerts. In addition, a displayed message (or audible signal) may be generated to indicate removal of the alert from the list.

To continue with the previous example, if previously the failure of the copy operation indicated failure of network connectivity between points A and B, successfully copying data from point A to point B may indicate that connectivity has been restored. Restoration of connectivity may be detected by any relevant peer component machine, and not necessarily by the component machine that originally detected the connectivity failure. Detection of restoration of connectivity may then be communicated to all peer component machines, and may result in clearing the alert.

Figure 3:
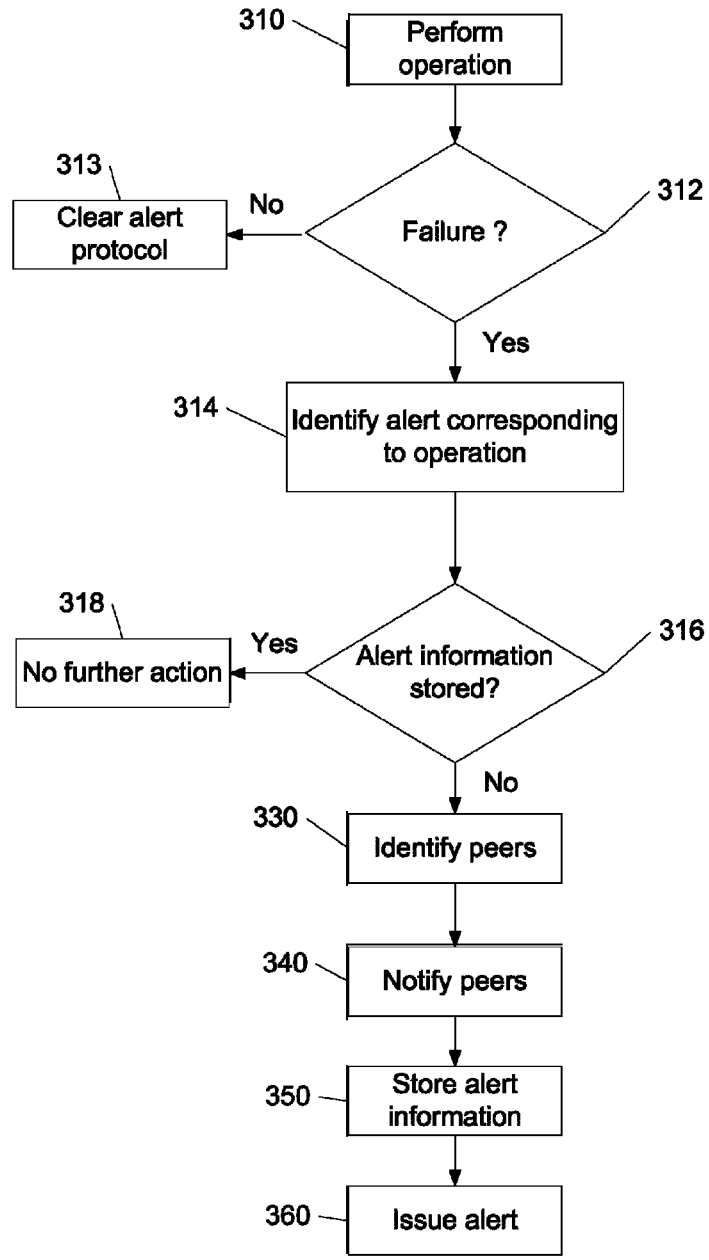
FIG. 3 is a flowchart of a process that is executed upon detection of a problem, in accordance with an embodiment of the invention.

FIG. 3 is a flowchart of a process that is executed upon detection of a problem, in accordance with an embodiment of the invention.

It should be understood with regard to this flowchart, and with regard to all flowcharts accompanying this description, that the division of the process into individual steps is for convenience of the description only. An alternative division into differently labeled step may yield identical results. All such alternative divisions into steps should be understood as falling within the scope of embodiments of the invention. Furthermore, it should be understood that, unless stated otherwise, the order of the steps as illustrated in this, or in any other flowchart accompanying this description, has been selected for convenience of the description only. Alternative ordering of the steps, or concurrent performance of the steps, may yield identical results. All such reordering of the steps should be understood as falling within the scope of embodiments of the invention.

Process 300 may be performed by a component machine of a distributed computing system upon performing an operation (step 310). A result of the operation is detected and evaluated (step 312). If the operation is performed successfully, the clear alert protocol (see FIG. 4) is followed (step 313). Upon failure to perform the operation, thus detecting a problem, the component machine retrieves the alert information corresponding to the operation (step 314). This information may be a part of a list or table of alert types and associated operations that had been previously retrieved from a central repository of the distributed computing system, e.g. as part of an initialization process. The component machine then examines its associated data storage device to determine if it possesses the alert information corresponding to a previously received notification that relates to the failed operation (step 316). If such information is found, no further action is taken regarding issuing an alert with respect to the discovered problem (step 318).

If no corresponding alert information is stored, the component machine interacts with a central repository of the distributed computing system to identify its peers (step 330). The peer component machines may include any component machines of the distributed computing system that are configured to perform the same operation. After identifying its peers, the component machine that discovered the problem notifies its peers via the distributed computing system (step 340). The notification identifies the alert that is to be issued. The component machine that discovered the problem stores the alert in its associated data storage device (step 350).

The component machine that discovered the problem issues a corresponding alert (step 360). Typically, the alert is issued by sending an alert message via the distributed computing system to an administration console. The administration console may then generate an appropriate alert output via a user interface associated with the administration console.

Figure 4:
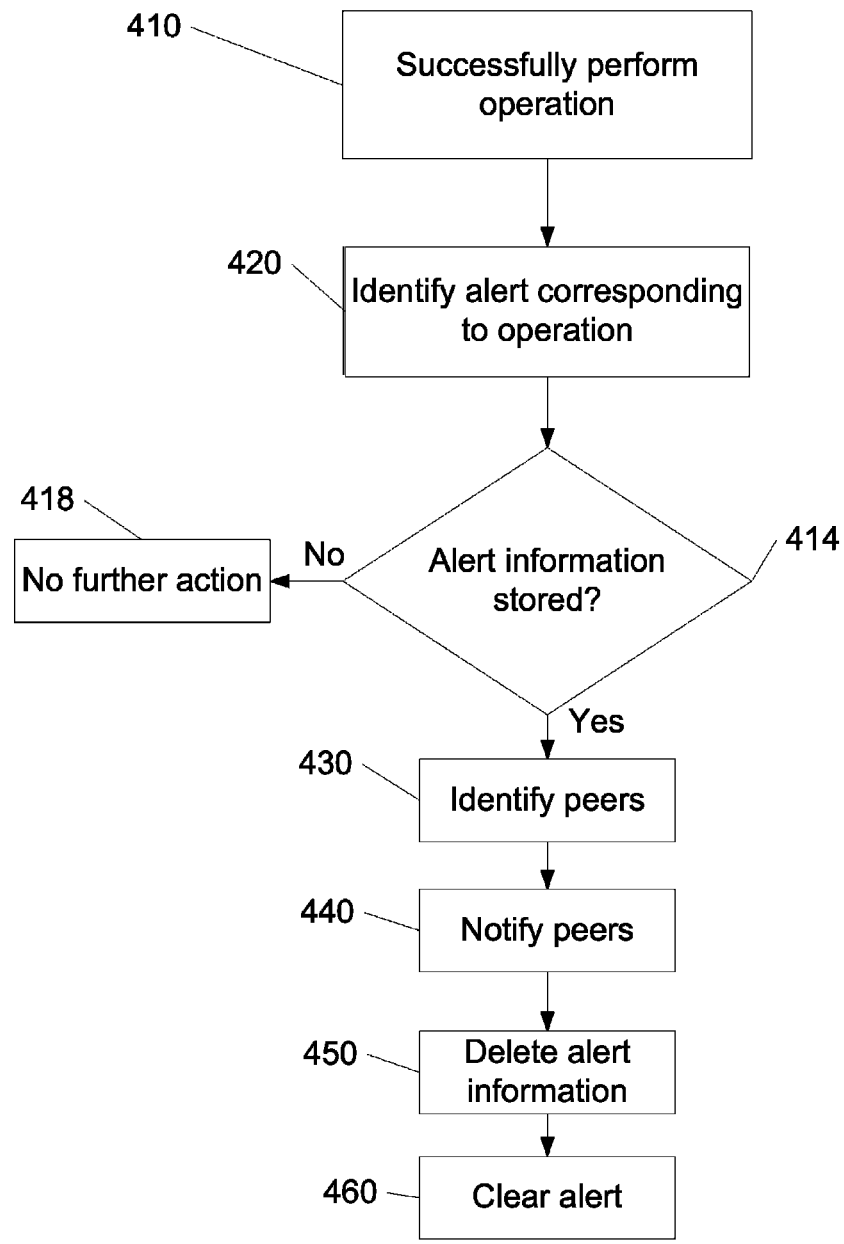
FIG. 4 is a flowchart of a process that is executed upon resolution of a problem, in accordance with an embodiment of the invention.

FIG. 4 is a flowchart of a process that is executed upon resolution of a problem, in accordance with an embodiment of the invention. Process 400 may be performed by a component machine of a distributed computing system upon successfully performing an operation, which indicates that there are no problems associated with the operation.

As described above, a component machine of a distributed computing system may successfully perform an operation (step 410). The component machine retrieves the alert information corresponding to the operation from its associated storage device (step 420). This information may be part of a list of alert types and associated operations that had been previously retrieved from a central repository of the distributed computing system, e.g. as part of an initialization process. Then, the component machine examines its associated data storage device to determine whether the alert information had been previously received and stored due to a previously detected failure of the operation (step 414). If not, no further action is taken toward clearing an alert (step 418).

If corresponding alert information had been stored, the successful completion of the operation by the component machine may be interpreted to indicate that the problem that had caused failure of the operation has been resolved. The component machine interacts with a central repository of the distributed computing system to identify its peers (step 430). After identifying its peers, the component machine that discovered resolution of the problem notifies its peers, via the distributed computing system, that the problem has been resolved (step 440). The notification identifies the alert to be cleared. As a result of receiving the notification, each peer component machine may delete the alert information from its associated data storage device. Similarly, the component machine that successfully performed the operation and sent the notification, deletes the relevant alert information from its associated data storage device (step 450).

The component machine that successfully performed the operation then clears the alert relating to the operation (step 460). Typically, the alert is cleared by sending a clear alert message via the distributed computing system to an administration console. The administration console may then remove the relevant alert from a list of current alerts displayed via its user interface.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as a method for issuing and clearing alerts in a distributed computing system in accordance with an embodiment of the invention.

The computer-readable medium may be a non-transitory computer-readable media including all forms and types of memory and all computer-readable media except for a transitory, propagating signal. In one implementation, external memory may be the non-volatile memory or computer-readable medium.

While there have been shown and described fundamental novel features of the invention as applied to one or more embodiments, it will be understood that various omissions, substitutions, and changes in the form, detail, and operation of these embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for alert processing in a distributed computing system that includes a plurality of component machines, the method comprising:
    upon failing to perform an operation by one of the component machines and upon verifying that no alert information regarding the operation is currently stored by that component machine, said one of the component machines performing:
      identifying other component machines of the distributed computing system that are peer machines with regard to the operation,
      sending a notification regarding failure to perform the operation to the peer machines for notifying the peer machines to store alert information regarding the operation,
    storing the alert information regarding the operation; and
    issuing an alert corresponding to the failure to perform the operation.

2. The method of claim 1, further comprising:
    upon successfully performing a previously failed operation by one of the component machines and upon verifying that alert information regarding the previously failed operation is currently stored by that component machine, said one of the component machines performing:
      identifying other component machines of the distributed computing system that are peer machines with regard to the previously failed operation,
      sending a notification regarding the successful performance of the previously failed operation to the peer machines for notifying the peer machines to delete stored alert information regarding the previously failed operation,
      deleting the currently stored alert information regarding t ie previously failed operation, and
      clearing the alert.

3. The method of claim 2, wherein clearing the alert comprises sending a notification regarding the successful performance of the previously failed operation to an administration console of the distributed computing system.

4. The method of claim 1, wherein the alert information is retrieved from a previously stored list of types of alerts and their corresponding operations.

5. The method of claim 4, wherein the list is obtained from a central repository of the distributed computing system during initialization of said one of the component machines.

6. The method of claim 1, wherein issuing an alert comprises sending a notification regarding failure to perform the operation to an administration console of the distributed computing system.

7. The method of claim 1, wherein identifying other component machines comprises retrieving data from a central repository.

8. A non-transitory computer readable medium having stored thereon instructions that when executed by a processor of a component machine of a distributed computing system that includes a plurality of component machines will cause the processor to:
- upon failing to perform an operation by the component machine and upon verifying that no alert information regarding the operation is currently stored by the component machine, the component machine performing:
  - identifying other component machines of the distributed computing system that are peer machines with regard to the operation,
  - sending a notification regarding failure to perform the operation to the peer machines tor notifying the peer machines to store alert information regarding the operation,
  - storing the alert information regarding the operation; and
  - issuing an alert corresponding to the failure to perform the operation.

9. The non-transitory computer readable medium of claim 8, wherein the alert information is retrieved from a previously stored list of types of alerts and their corresponding operations.

10. The non-transitory computer readable medium of claim 9, wherein the list is obtained from a central repository of the distributed computing system during initialization of the component machine.

11. The non-transitory computer readable medium of claim 8, wherein issuing an alert comprises sending a notification regarding failure to perform the operation to an administration console of the distributed computing system.

12. The non-transitory computer readable medium of claim 8, wherein identifying other component machines comprises retrieving data from a central repository.

13. A distributed computing system for processing of alerts, the system comprising:
- a plurality of component machines capable of intercommunication, each component machine including a processor and a computer usable medium connected to the processor, wherein the computer usable medium contains a set of instructions to:
  - upon failing to perform an operation by one of the component machines and upon verifying that no alert information regarding the operation is currently stored by that component machine, said one of the component machines performing:
    - identifying other component machines of the distributed computing system that are peer machines with regard to the operation,
    - sending a notification regarding failure to perform the operation to the peer machines for notifying the peer machines to store alert information regarding the operation,
    - storing the alert information regarding the operation, and
    - issuing an alert corresponding to the failure to perform the operation; and
  - upon successfully performing a previously failed operation by one of the component machines and upon verifying that alert information regarding the previously failed operation is currently stored by that component machine, said one of the component machines performing:
    - identifying other component machines of the distributed computing system that are peer machines with regard to the previously failed operation,
    - sending a notification regarding the successful performance of the previously failed operation to the peer machines for notifying the peer machines to delete stored alert information regarding the previously failed operation,
    - deleting the currently stored alert information regarding the previously failed operation, and
    - clearing the alert; and
- an administration console capable of communicating with said plurality of component machines, the administration console including a user interface via which an issued alert may be displayed.

14. The system of claim 13, comprising a central repository that includes information regarding said plurality of component machines and operations that each of said plurality of component machines is configured to perform.

15. The system of claim 13, comprising a central repository that includes information regarding types of alerts and their corresponding operations.

16. The system of claim 13, comprising a communications medium for enabling the intercommunication among said plurality of component machines and for enabling communication between the administration console and said plurality of component machines.

17. The system of claim 13, wherein each component machine of said plurality of component machines comprises a data storage component configured to store the alert information.

18. The system of claim 13, wherein the user interface is configured to display a list of issued alerts that were not cleared.

* * * * *

UNITED STATES PATENT AND TRADEMARK OFFICE
CERTIFICATE OF CORRECTION

PATENT NO. : 8,667,340 B2  
APPLICATION NO. : 13/074795  
DATED : March 4, 2014  
INVENTOR(S) : Anna Stepanenko et al.

Page 1 of 1

It is certified that error appears in the above-identified patent and that said Letters Patent is hereby corrected as shown below:

In the Claims

Column 8, line 52, in Claim 2, delete "t ie" and insert -- the --, therefor.

Column 9, line 17, in Claim 8, delete "tor" and insert -- for --, therefor.

Signed and Sealed this  
Second Day of September, 2014

Michelle K. Lee  
*Deputy Director of the United States Patent and Trademark Office*